United States Patent [19]

Iwashita et al.

[11] Patent Number: 4,699,492
[45] Date of Patent: Oct. 13, 1987

[54] PHOTOGRAPHIC INFORMATION INPUT DEVICE FOR CAMERA

[75] Inventors: Tomonori Iwashita, Kanagawa; Nobuhiko Shinoda, Tokyo; Akira Yamada, Kanagawa, all of Japan

[73] Assignee: Canon Kabushiki Kaisha

[21] Appl. No.: 903,411

[22] Filed: Sep. 3, 1986

[51] Int. Cl.⁴ ............................................... G03B 17/18
[52] U.S. Cl. .................................................... 354/289.1
[58] Field of Search ................ 354/288, 289.1, 289.12

[56] References Cited

U.S. PATENT DOCUMENTS 4,483,601 11/1984 Sekida et al. ................ 354/289.1 X
4,538,891 9/1985 Matsuyama et al. ............. 354/289.1

FOREIGN PATENT DOCUMENTS 112724 7/1982 Japan ................................ 354/289.1

Primary Examiner—W. B. Perkey
Attorney, Agent, or Firm—Toren, McGeady & Associates

[57] ABSTRACT

A photographic information input device for a camera in which a correction effectiveness variable switch for controlling the effectiveness-ineffectiveness of a correction switch of photographic information is provided in a lidded recess of the camera body. When this recess is closed, the correction effectiveness variable switch is made not operable. With the lid opened, when the correction effectiveness variable switch is operated, the effective state of the correction switch is latched, later making it possible to correct the photographic information merely by operating the correction switch. Further, when the lid is closed, the correction switch is automatically changed over to the ineffective state.

16 Claims, 13 Drawing Figures

PHOTOGRAPHIC INFORMATION INPUT DEVICE FOR CAMERA

BACKGROUND OF THE INVENTION

1. Field of the Invention

This invention relates to photographic information input devices for cameras, and more particularly to such device which is used for setting, for example, an exposure mode such as programmed or manual mode, and the desired values of exposure factors such as the aperture and shutter speed.

2. Description of the Related Art

In the recent cameras, particularly single lens reflex cameras, an increasing number of ones whose various functions are automated and in which the user can select these automated various functions have been developed. For example, in the exposure control, there are the programmed mode in which the camera automatically sets both of the shutter speed and aperture value, the shutter priority mode in which the user sets the shutter speed and the camera automatically sets the aperture value on the basis of the object brightness and shutter speed, the aperture priority mode in which the user sets the aperture value and the camera automatically sets the shutter speed on the basis of the object brightness and the aperture value, and the manual mode in which the user sets both of the shutter speed and aperture value. Further even in the focus adjustment and film transportation, for the various functions, there are modes the user can select.

The fact that the number of modes the user can select in such a manner increases, though enabling the user to select a mode suited to an individual photographic situation, brings out a drawback that as the number of functions to be set increases, the operation becomes complicated.

To eliminate this drawback, the use of liquid crystal in the display and the use of buttons in the input members have been proposed.

This conventional proposal for improvement is, for example, U.S. patent application Ser. No. 681,021, now abandoned, (filed Dec. 13, 1984) assigned to the assignee of the present invention. In this proposal, the selection of selectable various kinds of photographic informations is performed by a selection operating switch such as a pushbutton. The particular photographic information selected by this selection operating switch, for example, the aperture value information, is then corrected by a correction operating switch such as another push-button. The photographic information selected here and the corrected state are displayed by a display device such as a liquid crystal display element. Thus, the user is made understand them. According to this method, the conventional structure having the equal number of mechanical correction dials to the number of kinds of photographic informations was improved so that, because a plurality of operating switches such as push buttons and a display were arranged, the space aspect on the camera body, the cost aspect and others could be improved.

However, the above-described conventional improved proposal took account of the fact that the user would unintentionally touch the operating switch to effect an erroneous operation since the various operating switches were arranged on both shoulder areas of the upper surface of the camera body and had a feature that the correction carries out only when two switches are simultaneously operated. Therefore, the problem of erroneous operation has been solved, but the user is being forced to use both hands in management.

SUMMARY OF THE INVENTION

An object of the present invention is to provide a photographic information input device for a camera which enables the erroneous operation to be prevented and is excellent even in the manageability.

Other objects of the invention will become apparent in the following detailed description of an embodiment thereof.

DETAILED DESCRIPTION OF THE PREFERRED EMBODIMENTS

Figure 1:
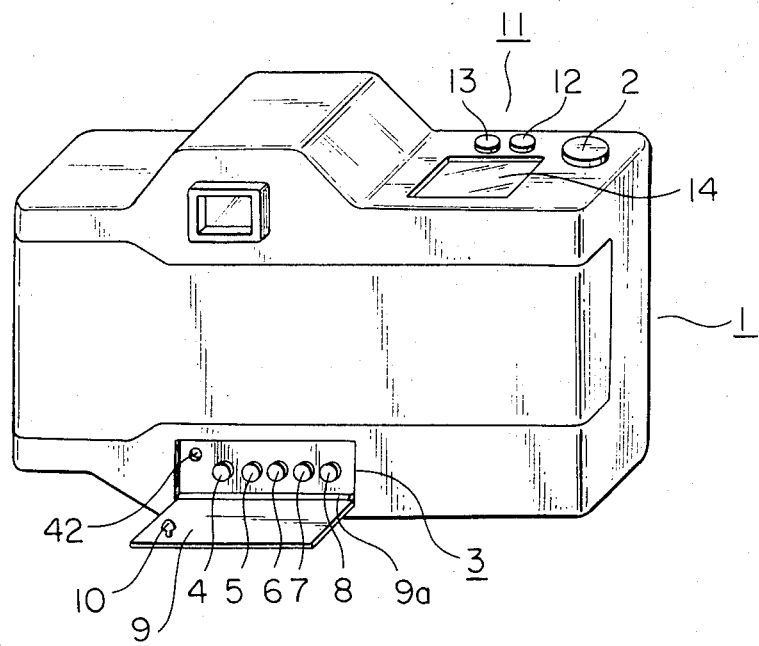
FIG. 1 is a perspective view of a camera employing an embodiment of the present invention.
Figure 2:
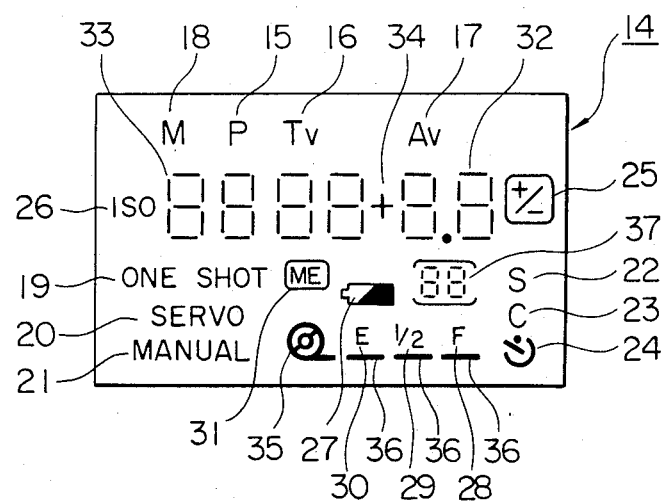
FIG. 2 is a plan view of the display segments of a display device arranged in the camera of FIG. 1.
Figure 3:
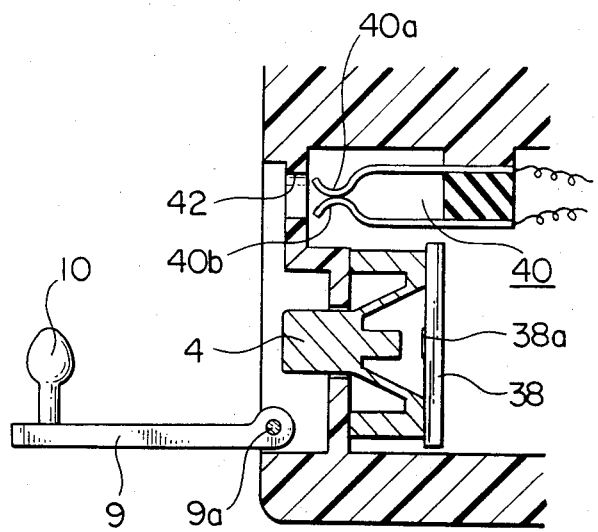
FIG. 3 is a sectional view in enlarged scale of the main parts of FIG. 1.
Figure 4:
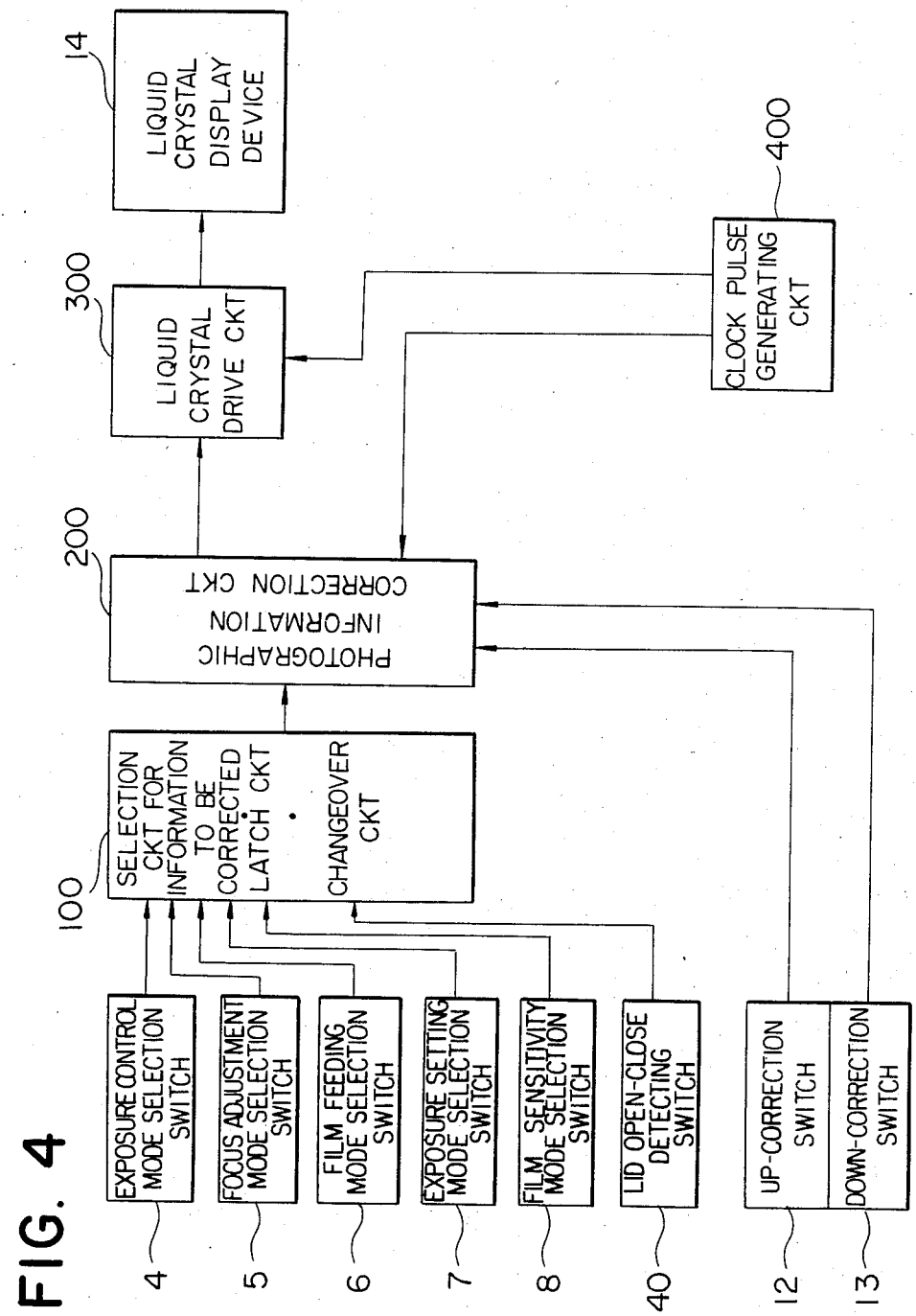
FIG. 4 is a block diagram of the circuitry of the camera of FIG. 1.

The present invention is next described in detail in connection with an embodiment thereof. Referring first to FIGS. 1 to 4, the whole arrangement of the invention will be explained. FIG. 1 is a perspective view of the whole body of the camera. FIG. 2 is a plan view of the main parts of illustrating the display segments of the liquid crystal display device. FIG. 3 is a sectional view of the main parts of the mode selection members and a lid covering the mode selection members. FIG. 4 is a circuit construction diagram illustrating the circuit construction of the whole. In FIG. 1, a camera body 1 has a shutter release button 2. A mode selection member arrangement portion 3 for selecting a plurality of kinds of photographic informations has an exposure control mode selection switch 4, a focus adjustment mode selection switch 5, a film transportation mode selection switch 6, an exposure setting mode selection switch 7 and a film sensitivity mode selection switch 8. A lid 9 is rotatably mounted on a shaft 9a so that when closed, it can cover all the switches 4 to 8, and has a projection 10 for click formed by an insulating material. A correction member 11 for correcting the photographic information is arranged on the upper surface of the camera, and is constructed with an up-correction switch 12 and a down-correction switch 13. A liquid crystal display device 14 as the electro-optical display means is arranged near the switches 12 and 13.

FIG. 2 illustrates the display content of the liquid crystal display device 14. For the purpose of better understanding, all the segments are shown to appear black on white background. In FIG. 2, the programmed mode in which the aperture value and the shutter speed are automatically set is indicated at 15; the shutter priority mode in which the aperture value is automatically set is indicated at 16; the aperture priority mode in which the shutter speed is automatically set is indicated at 17; the manual mode is indicated at 18. The symbols 15 to 18 represent the exposure control modes which can be called out by the exposure control mode selection switch 4. A one-shot mode in which as automatic focusing is performed when once in focus, the focusing operation is terminated is indicated at 19; a servo mode in which automatic focusing always goes on to maintain an object to be photographed at a sharp focus is indicated at 20; a manual focus mode in which focusing is performed manually is indicated at 21. The words 19 to 21 represents the focus adjustment modes which can be called out by the focus adjustment mode selection switch 5. A single mode in which shooting is performed one frame by one frame for one time of depressing operation of the release button 2 is indicated at 22; a continuous shooting mode in which a series of continous shots are taken so long as the release button 2 continues to be depressed is indicated at 23. The letters 22 and 23 represent the film feeding modes which can be called out by the film feeding mode selection switch 6. A symbol 24 represents a self-timer mode. A symbol 25 represents an exposure correction mode. Letters 26 represent a film sensitivity mode. A symbol 27 represents a battery check mode. Letters 28 to 30 represent indices of the battery content. Letters 31 represent a multiple exposure mode. A first numeral display portion 32 for displaying an aperture value or a value of the exposure correction factor is constructed with 7-segments for two digits and a decimal point segment. A second numeral display portion 33 for displaying a value of the shutter time or the film sensitivity is constructed with 7-segments for four digits. The plus or minus of the exposure correction factor is displayed at 34. When a film cartridge is loaded, a symbol 35 appears. Three bar-shaped segments 36 show the feeding state of the film or cooperate with the battery content indices 28 to 30. A third numeral display portion 37 for displaying the number of exposed frames is constructed with two 7-segments. Here, the display portions 16, 32, or 17, 33 represent the exposure setting modes which can be called out by the exposure setting mode selection switch 7. Also, the display portions 26, 33 represent the film sensitivity mode which can be called out by the film sensitivity mode setting switch 8.

In FIG. 3, we explain about the structure of each switch 4–8 and a lid open-close detecting switch 40 responsive to the opening-closing operation of the lid 9. This FIG. 3 shows a view of cross-sections at the positions of the exposure control mode selection switch 4 and hole 42. The selection switch 4 is formed to a publicly known electrically conductive rubber switch body itself having a click force. When pushed to deformation, the switch 4 itself touches a contact pattern 38*a* formed on a circuit board 38. So it turns on. For note, the other selection switches 6 to 8 are similar in construction to the switch 4. The hole 42 is provided in a position into which the click projection 10 is inserted when the lid 9 is closed. The switch 40 for detecting whether the lid 9 is open or closed is comprised of two contacts 40*a* and 40*b*. When the lid 9 is open, both contacts 40*a* and 40*b* touch each other by their self-resilient forces to produce a signal representing the open state of the lid 9. When the lid 9 is closed, on the other hand, the click projection 10 forcibly pushes both contacts 40*a* and 40*b* away from each other at their free ends thereof to produce a signal representing the closed state of the lid 9.

Next, in FIG. 4, the total structure concerning the photographic information input device for camera according to the present embodiment. A circuit 100 is constructed to have the role of a correction information selection circuit in which when the lid open-close detecting switch 40 produces the open signal as the lid 9 is opened and when any one of the selection switches 4 to 8 is pushed to turn on, which switch 4–8 is operated is judged to give the outputs of the correction switches 12 and 13 to the corresponding photographic information mode in the next stage of a photographic information correction circuit 200, the role of a latch circuit for latching the selected state of the correctable photographic information mode even after the operation of the switch 4–8 has been released, and the role of a changeover circuit for changing over in such a manner that when the lid open-close detecting switch 40 produces the close signal as the lid 9 is closed, the above-described selected state is made the non-selected state, and the above-described latch state is released. The photographic information correction circuit 200 receives the output from the circuit 100 to give the output of the correction switch 12, 13 only to the selected photographic information mode so that the photographic information mode is corrected, and has the role of making ineffective the output of the correction switch 12, 13 when the close signal is being produced from the detecting switch 40. That is, after the correction switch 12, 13 has been made effective (able to alter the actual photographic information by operating it) by opening the lid 9 and pushing any of the switches 4–8 to turn on, if the lid 9 is closed, the correction switch 12, 13 can automatically be made ineffective (impossible to alter the photographic information even by operating it). A liquid crystal drive circuit 300 controls the liquid crystal display device 14 to selectively display the photographic information mode made correctable by the photographic information correction circuit. A clock pulse generating circuit 400 supplies clock pulses usable in a circuit for preventing the chattering in the operation of the correction switch 12, 13 to the photographic information correction circuit 200, and clock pulses usable to flicker a particular display portion for the purpose of indicating the presently correcting state in the correctable photographic information mode display selectively displayed in the liquid crystal display device 14 to the liquid crystal drive circuit 300.

Figure 7:
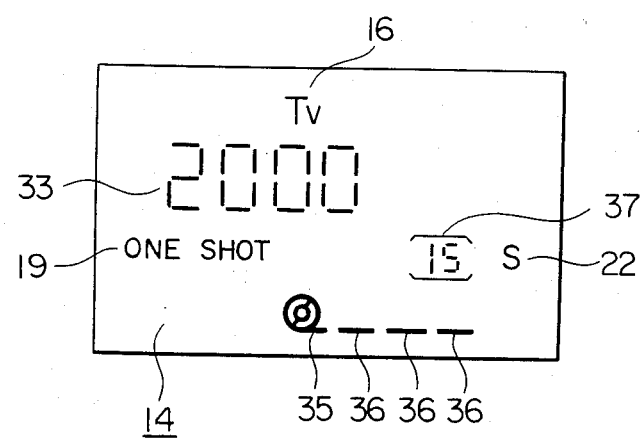
FIGS. 7 to 10 are plan views of different displays of the display device of FIG. 2.
Figure 8:
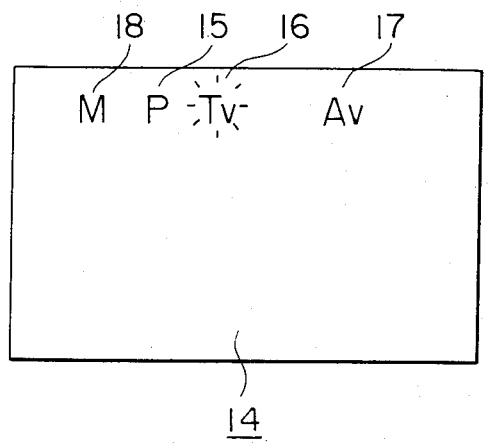
Figure 9:
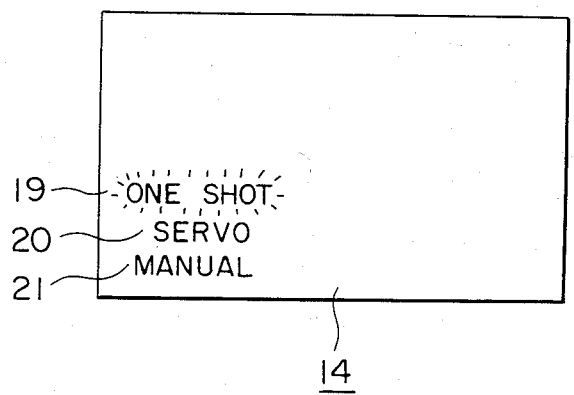

To explain simply the operation in the circuit arrangement shown in this FIG. 4, at first when the lid 9 is closed, or when the close signal is produced from the lid open-close detecting switch 40, even if the correction switch 12, 13 is operated, each kind of photographic information is not corrected so that, in the liquid crystal display device 14, the state of the presently set each photographic mode (numeral value or mark) is displayed as shown in FIG. 7. On the other hand, when the lid 9 is opened, or in a state where the open signal is produced from the detecting switch 40, and when any one of the selection switches 4–8 is pushed to turn on, the liquid crystal display device 14, taking an example of the exposure control mode selection switch 4 when turned on, presents all the corresponding display portions 15 to 18 to the exposure control mode as shown in FIG. 8, and the corresponding display portion 16 to the presently set mode state blinks. (The mere opening of the lid 9 only does not change the state of the display). Also, when, for example, the focus adjustment mode selection switch 5 is pushed to turn on, all the corresponding display portions 19 to 21 to the focus adjustment mode only are displayed in the liquid crystal display device 14 as shown in FIG. 9 and further the corresponding display portion 19 to the state of the mode set in the present state blinks, making the user to understand the present state. For note, this state is latched on the circuit even after the push-on operation of the selection switch 4 or 5 has been released. Here, an push-on operation of the upcorrection switch 12 or the down-correction switch 13 corrects the set state of the correctably selected photographic information mode. This corrected state is that in the case of FIG. 8 where the exposure control mode is selected, the shutter priority mode is corrected either to the aperture priority mode, or to the programmed mode. Also, this corrected state can be easily understood because the blinking place changes to the display portion 17 or 15. And, after the above-described correction has ended, when the lid 9 is closed and the lid open-close detecting switch 40 produces the close signal, the liquid crystal display device 14 returns to the presently set state of each photographic information mode as shown in FIG. 7 (where, because FIG. 7 is the state before the correction, when corrected, it becomes different display state from that of FIG. 7). The later output of the correction switch 12, 13 is also made ineffective so that even if it is operated, the correction of the photographic information does not take place.

For note, if the user desires to correct two or more photographic information modes, he can do it by calling out the photographic information modes desired to correct successively one at a time on the liquid crystal display device 14 by the selection switches 4–8. That is, because the correction switch 12, 13 is arranged as the common switch capable of correcting all the photographic information modes, the correction switch 12, 13 becomes effective only to the corresponding one photographic information mode to that of the selection switches 4–8 which is becoming effective at the point of the present time.

Figure 5:
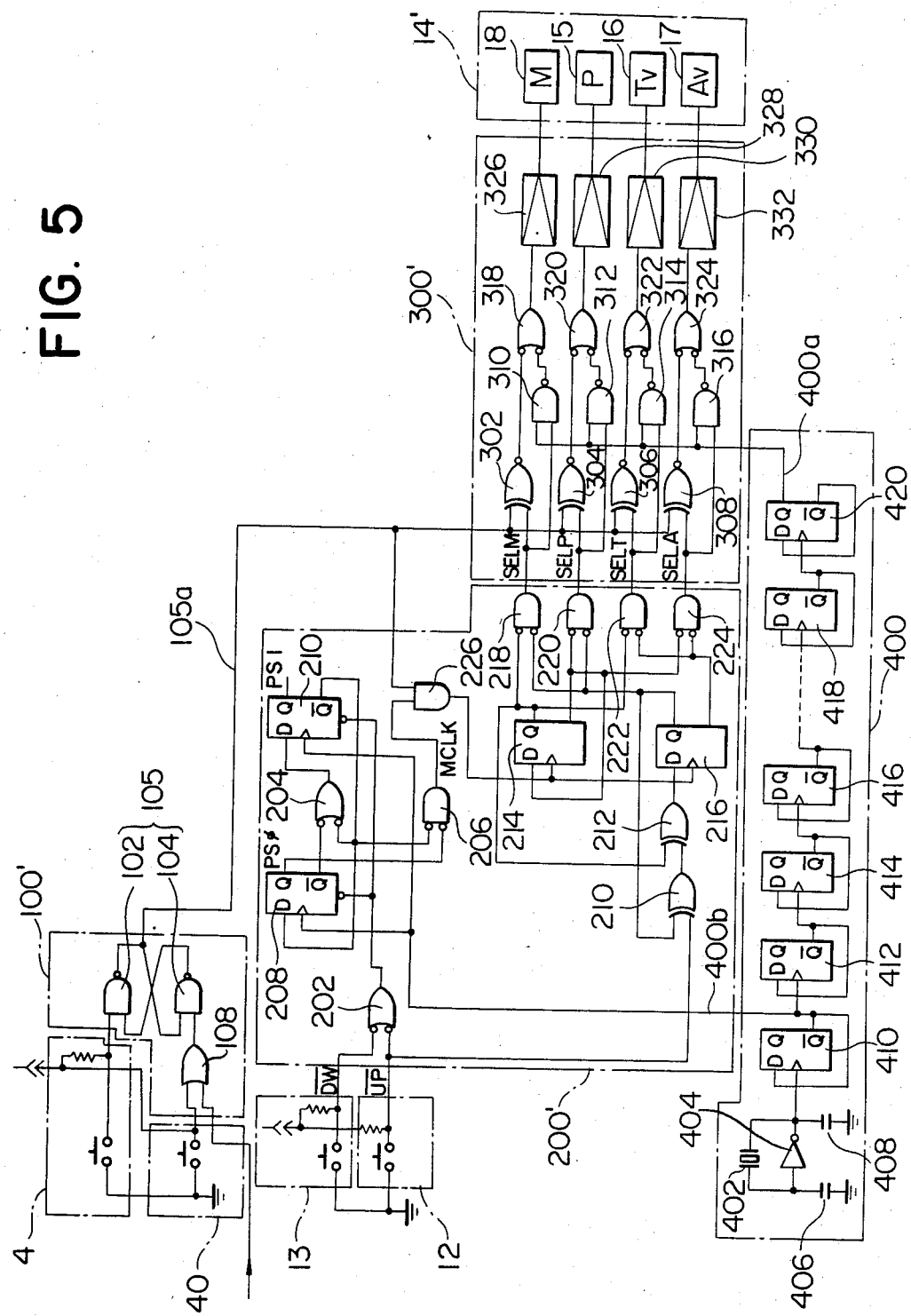
FIG. 5 is an electrical circuit diagram illustrating the details of parts of the circuitry of FIG. 4.

In FIG. 5 there is shown the detailed circuit structure concerning only the exposure control mode in the total structure shown in FIG. 4. The correction of the exposure control mode will be explained with reference to FIG. 5 below. For note, because the circuits 100, 200 and 300 and the liquid crystal display device 14 in FIG. 5 concern only with the exposure control mode, they are represented by using a prime on each reference numeral for the purpose of convenience.

In FIG. 5, the exposure control mode selection switch 4 normally produces an output of H, and when pushed to turn on, produces an output of L. The lid open-close detecting switch 40 responsive to opening of the lid 9 (see FIG. 3) produces an output of L, and responsive to its closure produces an output of H. A circuit 100' for selecting the information to be corrected, latching the push-on operation of the selection switch 4, and releasing the selection and the latching, is constructed with an S-R type flip-flop 105 (hereinafter referred to as "F/F") comprising NAND gates 102 and 104, and an OR gate 108. The up-correction switch 12 and the down-correction switch 13 both normally produce outputs of H, and change it to L in response to push-on operation. The photographic information correction circuit 200' has a chattering prevention arrangement comprising OR gates 202 and 204, an AND gate 206 and D type F/Fs 214 and 216, a decoder arrangement comprising AND gates 218 to 224, and an arrangement for controlling the effectiveness-ineffectiveness of correction comprising an AND gate 226. The liquid crystal drive circuit 300' is constructed with exclusive NOR gates 302 to 308, NAND gates 310 to 316, OR gates 318 to 324 and drivers 326 to 332. The clock pulse genneratring circuit 400 has a reference signal source comprising an oscillator 402, an inverter 404 and capacitors 406 and 408, and a frequency divider comprising D type F/Fs 410 to 420. The liquid crystal display device 14' has display portions 15 to 18.

Next, the operation of the circuit of FIG. 5 will be explained. Because usually, or at the time of shooting of the camera, the lid 9 is closed, the detecting switch 40 produces the output of H, thereby the S-R F/F 105 of the circuit 100' is reset. Therefore, the output 105a of the F/F 105 is L, and the AND gate 226 of the circuit 200' usually has the output of L, so that even if the correction switch 12, 13 is operated, its output signal becomes ineffective. Therefore, the correction of the exposure control mode and other photographic informations cannot be carried out.

Also, because this output of L from the S-R F/F 105 is supplied to the one input of each of the exclusive NOR gates 302 to 308 of the liquid crystal drive circuit 300', the output of one of the exclusive NOR gates 302, 304, 306 and 308 which corresponds to the presently selected state by the decoder arrangement of AND gates 218 to 224 of the circuit 200' or is supplied with the output of H from one of the AND gates 218, 220, 222 and 224, is changed to L which then causes any one of the OR gates 318, 320, 322 and 324 to change its output to H, thereby one display portion 15, 16, 17 or 18 of the liquid crystal display device 14' is rendered operative (visible), and the others are rendered inoperative (invisible) (for example, the state shown in FIG. 7). To explain concretely by taking an example, assuming that at the present time, for example, the AND gate 218 of the circuit 200' only produces an output of H, while the other AND gates 220 to 224 produce outputs of L, then the exclusive NOR gate 302 only produces an output of L, while the other exclusive NOR gates 304 to 308 produce outputs of H. And, in this state, the NAND gate 310 only produces clock pulses 400a of low frequency from the clock pulse generating circuit 400, while the other NAND gates 312 to 316 all continue to produce outputs of H. Therefore, the output which is continued of H is produced only from the OR gate 318, and the output which is continued of L is produced from any of the other OR gates 320 to 324, so that the display portion 18 in the liquid crystal display device 14' only operates, and the other display portions 15 to 17 become inoperative.

Meanwhile, when the lid 9 is opened, the detecting switch 40 produces the output of L, thereby the S-R F/F 105 is released from the resetting. For note, the mere opening of the lid 9 only leads to allow for the output of the F/F 105 to remain L. So, up to this state, the correction switches 12 and 13 do not yet become effective.

Here, when the exposure control mode selection switch 4 is pushed to turn on, the S-R F/F 105 is set and changes its output from L to H. Therefore, the input at one terminal of the AND gate 226 of the circuit 200' is made H, rendering the later correction switches 12 and 13 effective, and one input terminal of each of the exclusive NOR gates 302–308 is made H, causing the display form of the liquid crystal display device 14'. To explain this change of the display form in connection with the above-cited example, because, at the present state, the AND gate 218 only produces the output of H, and the other AND gates 220–224 produce the outputs of L, the OR gate 318 only produces pulses in synchronism with the clock pulses 400a, and the other OR gates 320–324 produce the outputs of continuous H. Therefore, the display portion 18 of the liquid crystal display device 14' only performs a blinking operation, and the other display portions 15–17 perform the normal operation. For the user, it is made possible to understand that at the present time the correctable state has been formed, that what is selected as the mode to be corrected is the exposure control mode, and that in the exposure control mode, what corresponds to the display portion 18, or the manual mode is selected.

Figure 6:
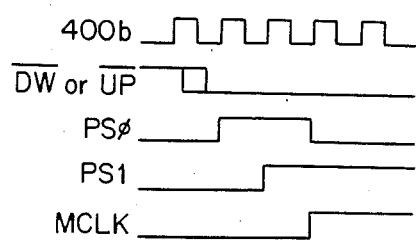
FIG. 6 is a pulse timing chart.

Here, when, for example, the up-correction switch 12 is once pushed on, it is in the circuit 200' that in delay by the chattering generating time as shown in the time chart of FIG. 6, the AND gate 206 produces a signal (MCLK) of H, and the AND gate 226 produces the output of H. And, this output of H from the AND gate 226 is supplied to the D type F/Fs 214 and 216 at their clock inputs. As one-count up operation is carried out, according to the above-cited one example, the AND gate 220 as the decoder only changes its output to H, while the other AND gates 218, 222 and 224 change their outputs to L. Therefore, by this correcting operation, the display portion 15 of the liquid crystal display device 14' changes to the blinking operation, and the operation of the other display portions 16–18 becomes normal. After that, when the up-correction switch 12 is again pushed on, finally by now the display portion 16 of the liquid crystal display device 14' changes to the blinking operation. Subsequently, each time the up-correction switch 12 is pushed on, the blinking place shifts as the display portion 16→the display portion 17→the display portion 18 the display portion 15. On the other hand, when the down-correction switch 13 is pushed on, the shifting direction can be reversed as, for each operation, the display portion 18→the display portion 17→the display portion 16→the display portion 15.

And, when the correction of the exposure control mode the user has intended is complete, he will then close the lid 9. By this closure of the lid 9, the detecting switch 40 produces the output of H, causing the S-R F/F 105 of the circuit 100' to return to the reset state, and the AND gate 226 of the circuit 200' to be forcibly closed so that the later operation of the correction switches 12 and 13 is made ineffective, and the liquid crystal display device 14' is reset in the initial state, that is, as shown in FIG. 7, only that of the display portions which has been selected by the correction operates, while the other display portions are inoperative.

For note, the circuit 100' includes an arrangement that an L output as the push-on signal of the other selection switches 5–8 is supplied through the OR gate 108 to the reset input terminal of the S-R F/F 105. When two or more photographic informations are corrected in sequence, the precedently corrected photographic information is automatically rendered non-selective by the correcting operation of the later photographic information. To explain concretely by taking an example, when the user first pushes the exposure control mode selection switch 4 in order to correct the exposure control mode, the output 105a of the S-R F/F 105 changes to H. At this point in time, therefore, it is understood that the exposure control mode has been selected out of the plurality of kinds of photographic informations. And, after the correction of this exposure control mode, if, for example, the selection switch 5 is pushed on in order to correct the focus adjustment mode, the S-R F/F 105 in the portion 100' for the exposure control mode of the circuit 100 is automatically reset, changing its output 105a to L. Thus, the exposure control mode can be made non-selective.

Figure 10:
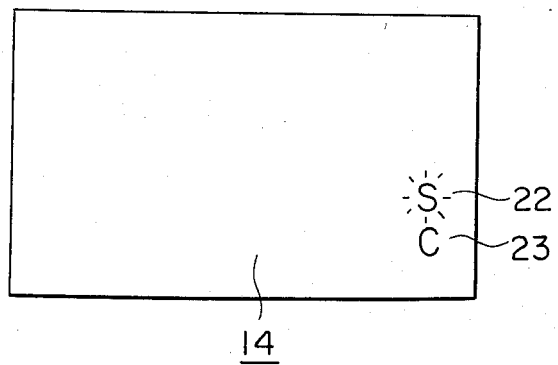

As a note, the display form when in correcting the focus adjustment mode is shown in FIG. 9, and the display form when in correcting the film feeding mode is shown in FIG. 10.

Figure 11:
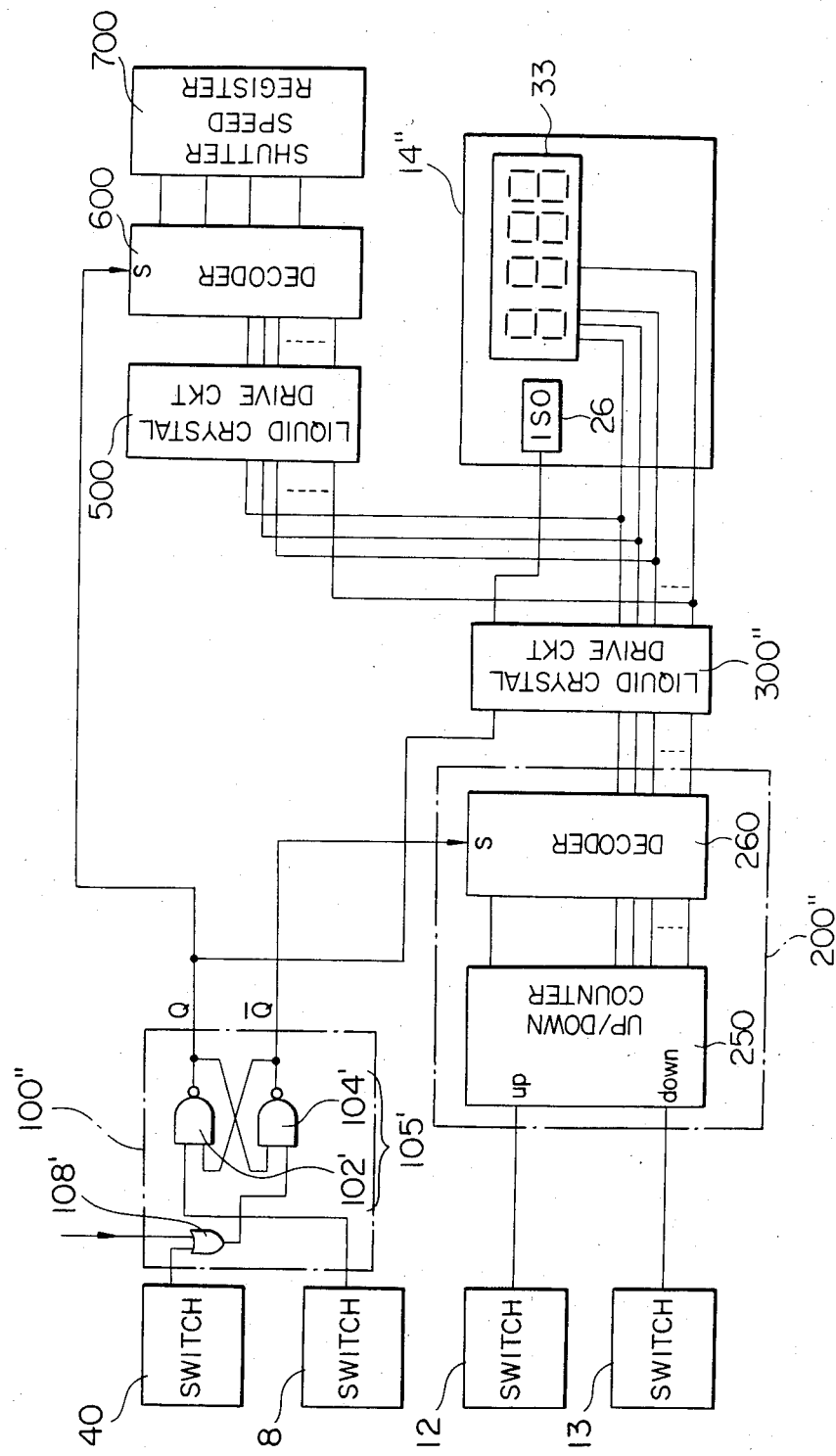
FIG. 11 is a circuit diagram of a portion of the circuitry of FIG., 4.

Next, by FIG. 11 a circuit structure concerning only the film sensitivity mode is shown. The correction of the film sensitivity mode will be explained by reference to FIG. 11. For note, about the circuits 100, 200 and 300 and the liquid crystal display device 14 in FIG. 11, because they concern only with the film sensitivity mode, for the purpose of convenience, each reference numeral is given double prime.

In FIG. 11, in the state that the lid 9 is closed, an S-R F/F 105' comprising NAND gates 102' and 104' of the circuit 100" has its $\bar{Q}$ output made H, and gives an input of H to a select input terminal S controlling the blanking of the decoder 260 of the circuit 200", thereby all the outputs of the decoder 260 are all made L. Meanwhile, because in this state, the Q output of L from the S-R F/F 105' is supplied to the select input terminal S of a decoder 600 for decoding a shutter speed register 700, the decoder 600 displays the presently set value of shutter time in the register 700 through a liquid crystal drive circuit 500 by a display portion 33 of the liquid crystal display device 14".

Figure 12:
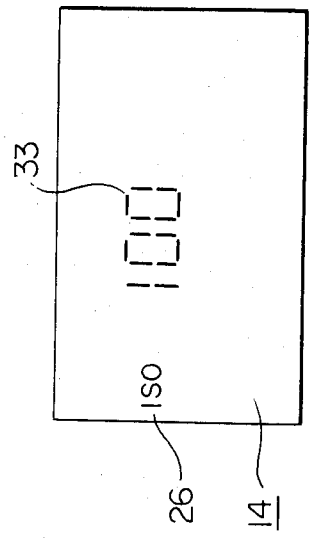
FIG. 12 is a plan view of what display is presented when the circuit of FIG. 11 operates.

Here, when the lid 9 is opened, and when the film sensitivity mode selection switch 8 is pushed on, the S-R F/F 105' inverts its output, for now changing the $\bar{Q}$ output to L. Therefore, the decoder 260 is released from the blanking output state, and decodes the present value of an UP/DOWN counter 250 to give it to the liquid crystal drive circuit 300", rendering operative the display portion 26 of the liquid crystal display device 14", and also causing the display portion 33 to display the value of film sensitivity of the presently set state (see FIG. 12). Here, if the counted value of the UP/DOWN counter 250 of the circuit 200" is corrected by operating the correction switch 12 or 13, its corrected value is displayed by the display portion 33 of the liquid crystal display device 14" as a matter of course. And, after the correction has ended, if the lid 9 is closed, the S-R F/F 105' of the circuit 100" is reset and returns to the initial state. For note, even in this circuit 100" there is incorporated an arrangement including an OR gate 108' for supplying the push-on signal of the other selection switches 4–7 to the reset input of the S-R F/F 105'.

Figure 13:
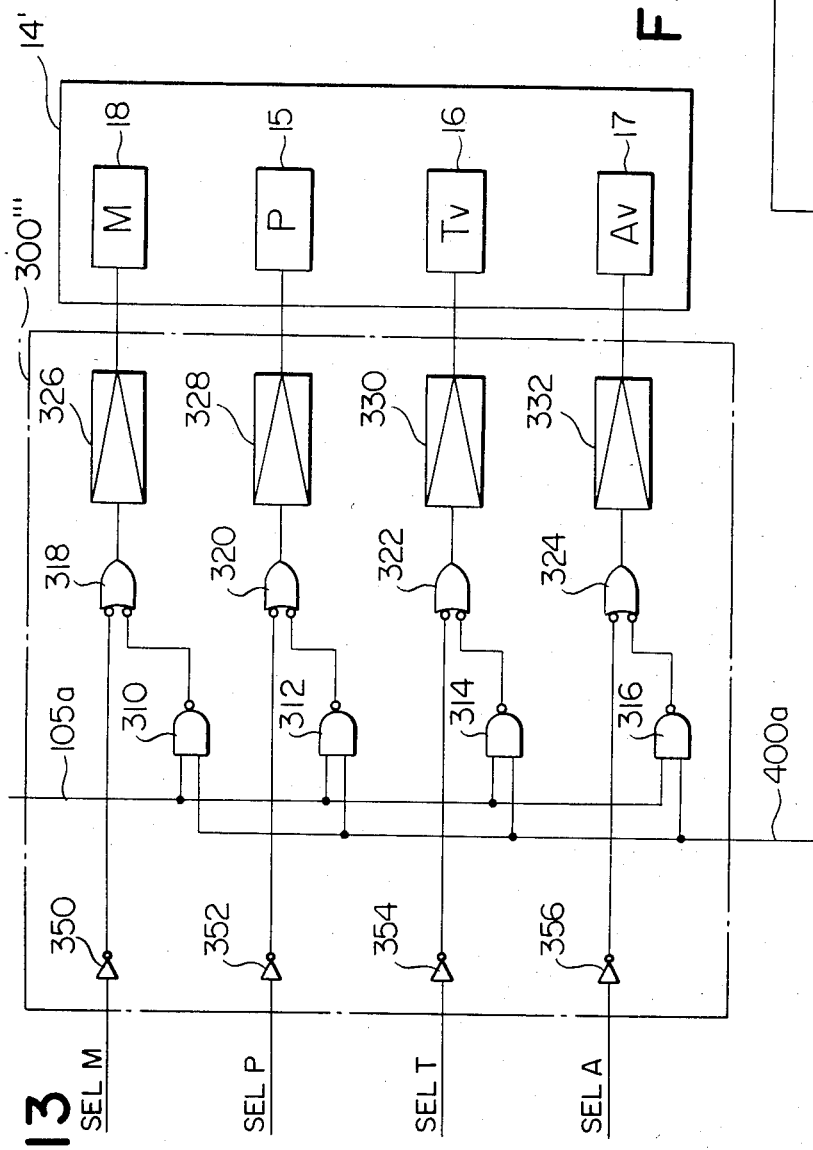
FIG. 13 is a circuit diagram of the main parts of another embodiment of the invention.

Next, another embodiment will be explained by reference to FIG. 13. This embodiment of FIG. 13 is a slight modification of the circuit 300' in the embodiment of FIG. 5 so that the normal and blinking operations of the display portions 15–18 of the liquid crystal display device 14' are exchanged by replacing the exclusive NOR gates 302 to 308 of FIG. 5 by inverters 350 to 356. For note, the output 105a of the S-R F/F 105 of the circuit 100' is supplied to one input terminals of the NAND gates 310 to 316.

To explain the operation of the circuit, with the lid 9 closed in the condition that of the AND gates 218 to 224 of the decoder of the circuit 200', for example, the AND gate 218 only produces an output of H, the output 105a is L. Therefore, the outputs of the NAND gates 310–316 are all H. In this case, only the display portion 18 of the liquid crystal display device 14' is normally operative, while the other display portions 15–17 are inoperative. On the other hand, when the lid 9 is opened and the exposure control mode selection switch 4 is pushed on, the output 105a becomes H. Therefore, the output of the OR gate 318, similarly to the first embodiment, is a continuous signal of H, but the OR gates 320–324 produce clock pulse signals in synchronism with the clock pulses 400a. Hence the display portion 18 operates normally, but the display portions 15 to 17 blink.

What is characteristic of the above-described embodiments is: Firstly in the state that the lid 9 is closed, the correction switches 12 and 13 are ineffective. So, even when the correction switches 12 and 13 are unintentionally pushed on during shooting or carrying the camera about, the correction of the photographic information is not carried out.

Secondly, the only opening of the lid 9 leaves the correction switches 12 and 13 to be ineffective as yet.

Thirdly, the lid 9 is opened and further the selection switch 4–8 is pushed on. Here, for the first time, the correction switches 12 and 13 are made effective. Moreover, even if the hand is removed from the selection switches 4–8, this effective state is latched by the S-R F/F 105, enabling the user to correct the photographic information by using one hand in operating the correction switches 12 and 13. Also, when this selection switch 4–8 is pushed on to render it correctable, the liquid crystal display portion 14 becomes a different display form for correction from the usual or non-corrective state, and can make the user to understand very easily that it has become correctable.

Fourthly, even in the case when there is a plurality of correctable photographic informations, if the user pushes on any corresponding one of the selection switches 4 to 8 to the desired particular photographic information, the circuit arrangement for correction immediately makes only the selected photographic information correctable. Only by pushing the common correction switch 12 or 13 to the plurality of corrections, the selected photographic information is automatically corrected.

Also, in this case, the corresponding display portions to the selected photographic information are all displayed in the liquid crystal display device 14 so that the user can easily understand what state it can be corrected to.

Fifthly, after the correction is complete, the user needs only to close the lid 9 by which the S-R F/F 105 is returned to the reset state to automatically make ineffective the correction switches 12 and 13 so that the particular photographic information selected for correction can be made non-selective. Without the necessity for the use to do any complicated operation, it is possible to perform the changing over from the corrective state to the usual state. Also, at the same time, the liquid crystal display device 14 too is automatically returned to the usual state.

Sixthly, when it is made the corrective state by pushing the selection switches 4–8, the presently set state by the selected particular photographic information and the correctable state can be easily understood to the user when the display form of the display portions (for example, the display portions 15–18) of the liquid crystal display device 14 is discriminated between the blinking and usual operations.

What is claimed is:
1. A photographic information input device for a camera comprising:
(a) a photographic information correction switch;
(b) a changeover switch;
(c) a lid body capable of opening and closing between states of covering and opening said changeover switch, said lid body not covering said correction switch;
(d) a lid switch for detecting the open-close operation of said lid body;
(e) photographic information correction control means for correcting the photographic information in response to the operation output of said correction switch when an output of the state that said lid body is open-operated is produced from said lid switch and said changeover switch has produced an operation output, said correction control means prohibiting the photographic information from being corrected despite said correction switch being operated, either when the output of the closed state of said lid body is produced from said lid switch, or when the operation output is not produced from said changeover switch even though the output of the state that said lid body has been open-operated is produced from said lid switch; and
(f) electro-optical display means for displaying the corrected information in response to said photographic information correction control means.

2. A camera according to claim 1, wherein said photographic information correction switch has an up-switch and a down-switch, and these switches produce different operation outputs from each other.

3. A camera according to claim 2, wherein said photographic information correction control means changes over the correcting direction of the photographic information between when the operation output of said up-switch is produced and when the operation output of said down-switch is produced.

4. A camera according to claim 1, wherein said photographic information correction switch and said changeover switch are arranged on different surfaces of the camera body.

5. A photographic information input device for a camera, comprising:
(a) a photographic information correction switch;
(b) a changeover switch;
(c) a lid body capable of opening and closing between states of covering and opening said changeover switch, said lid body not covering said correction switch;
(d) a lid switch for detecting the closing operation of said lid body;
(e) photographic information correction control means for correcting photographic information,
(e-1) said correction control means including a latch circuit for controlling the changing over the operation output of said correction switch from the ineffective state to the effective state when said changeover switch has produced the operation output, and for latching said effective state,
(e-2) said correction control means correcting the photographic information in response to the operation output of said correction switch when said latch circuit is latched in said effective state, and (e-3) said correction control means controlling the changing over of said latch circuit forcibly to the ineffective state when said lid switch has detected the closing operation of said lid body; and (f) electro-optical display means for displaying the corrected information in response to said photographic information correction control means.

6. A camera according to claim 5, wherein said photographic information correction switch has an upswitch and a down-switch, and these switches produce different operation outputs from each other.

7. A camera according to claim 6, wherein said photographic information correction control means changes over the correcting direction of the photographic information between when the operation output of said upswitch is produced and when the operation output of said down-switch is produced.

8. A camera according to claim 5, wherein said photographic information correction switch and said changeover switch are arranged on different surfaces of the camera body.

9. A photographic information input device for a camera, comprising:
   (a) a switch for selecting a photographic information to be corrected;
   (b) a correction information selection circuit responsive to the operation output of said selection switch for rendering a particular photographic information to be corrected the selective state;
   (c) a photographic information correction switch;
   (d) a photographic information correction circuit for correcting the particular photographic information selected by said selection circuit in response to the operation output of said correction switch;
   (e) electro-optical display means for displaying the corrected information by said correction circuit;
   (f) a lid body supported to be able to open and close for the purpose of covering said selection switch;
   (g) lid switch means for detecting the closing operation of said lid body; and
   (h) a changeover circuit for forcibly changing over the correction information selection state in said selection circuit to the non-selection state when the closing operation of said lid body has been detected by said lid switch means.

10. A camera according to claim 9, wherein said photographic information correction switch has an upswitch and a down-switch, and these switches produce different operation outputs from each other.

11. A camera according to claim 10, wherein said correction circuit changes over the correcting direction of the photographic information between when the operation output of said up-switch is produced and when the operation output of said down-switch is produced.

12. A camera according to claim 9, wherein said selection switch and said correction switch are arranged on the different surfaces of the camera body.

13. A photographic information input device for a camera, comprising:
   (a) a plurality of correction photographic information selection switches;
   (b) a correction information selection circuit responsive to operation output of a particular selection switch among said selection switches for rendering the particular photographic information to be corrected the selective state;
   (c) a photographic information correction switch;
   (d) a photographic information correction circuit for correcting the particular photographic information selected by said selection circuit in response to the operation output of said correction switch;
   (e) electro-optical display means for displaying the corrected information by said correction circuit;
   (f) a lid body supported to be able to open and close for the purpose of covering said selection switches;
   (g) lid switch means for detecting the closing operation of said lid body; and
   (h) a changeover circuit for forcibly changing over the correction information selection state in said selection circuit to the non-selection state when the closing operation of said lid body has been detected by said lid switch means.

14. A camera according to claim 13, wherein said photographic information correction switch has an upswitch and a down-switch, and these switches produce different operation outputs from each other.

15. A camera according to claim 14, wherein said correction circuit changes over the correcting direction of the photographic information between when the operation output of said up-switch is produced and when the operation output of said down-switch is produced.

16. A camera according to claim 13, wherein said selection switches and said correction switch are arranged on different surfaces of the camera body.

* * * * *

UNITED STATES PATENT AND TRADEMARK OFFICE
CERTIFICATE OF CORRECTION

PATENT NO. : 4,699,492

DATED : October 13, 1987

INVENTOR(S) : Tomonori Iwashita et al

It is certified that error appears in the above-identified patent and that said Letters Patent is hereby corrected as shown below:

In the heading of the Patent, it should read:

[30]  Foreign Application Priority Data

Sept. 6, 1985 [JP]  Japan .......... 60-198296

Signed and Sealed this

Twenty-second Day of March, 1988

Attest:

DONALD J. QUIGG

Attesting Officer

Commissioner of Patents and Trademarks